United States Patent [19]
Inagaki et al.

[11] Patent Number: 6,086,810
[45] Date of Patent: *Jul. 11, 2000

[54] METHOD OF AFFIXING SYNTHETIC RESIN FILM AND MOLDING RESIN

[75] Inventors: Jiro Inagaki; Takashi Shinoki, both of Kanagawa-ken, Japan

[73] Assignee: Teikoku Tsushin Kogyo Co., Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/800,210

[22] Filed: Feb. 12, 1997

Related U.S. Application Data

[63] Continuation of application No. 08/355,539, Dec. 14, 1994, abandoned.

[30] Foreign Application Priority Data

Jul. 12, 1994 [JP] Japan ................................. 6-183840

[51] Int. Cl.[7] .................................................. B29C 45/14
[52] U.S. Cl. .......................................................... 264/266
[58] Field of Search .................................... 264/250, 255, 264/259, 266, 294, 328.1, 328.7

[56] References Cited

U.S. PATENT DOCUMENTS

| | | | |
|---|---|---|---|
| 4,873,041 | 10/1989 | Masui et al. | 264/135 |
| 4,898,706 | 2/1990 | Yabe et al. | 264/266 |
| 4,942,008 | 7/1990 | Cahill | 264/294 |
| 4,968,474 | 11/1990 | Ito | 264/296 |
| 5,354,397 | 10/1994 | Miyake et al. | 264/266 |
| 5,417,905 | 5/1995 | Lemaire et al. | 264/266 |
| 5,423,705 | 6/1995 | Solomon, II | 264/247 |
| 5,443,767 | 8/1995 | Cahill | 264/266 |
| 5,478,644 | 12/1995 | Takahashi | 264/291 |
| 5,529,654 | 6/1996 | Kavanagh et al. | 264/544 |

*Primary Examiner*—Angela Ortiz
*Attorney, Agent, or Firm*—Wenderoth, Lind & Ponack, L.L.P.

[57] ABSTRACT

A method of strongly affixing a molding resin to a synthetic resin film in direct fashion includes preparing a synthetic resin film and a molding resin each of which consists of a thermoplastic material, stretching a prescribed surface of the synthetic resin film, simultaneously bringing the molten, high-temperature molding resin into contact with the surface of the synthetic resin film, while stretching of the surface thereof is in progress, in such a manner that the molding resin presses directly against this surface in a state of high pressure, and subsequently cooling a surface of contact between the synthetic resin film and molding resin to a temperature at which the molten molding resin solidifies. As a result, the surfaces of contact between the synthetic resin film and molding resin are directly and strongly fused.

3 Claims, 6 Drawing Sheets

METHOD OF AFFIXING SYNTHETIC RESIN FILM AND MOLDING RESIN

This application is a continuation application of now abandoned Ser. No. 08/355,539 filed Dec. 14, 1994.

BACKGROUND OF THE INVENTION

1. Field of the Invention

This invention relates to a method of strongly affixing a synthetic resin film and a molding resin together directly.

2. Description of the Related Art

According to the prior art, the following two methods are available for affixing a molding resin to a synthetic resin film:

(1) The synthetic resin film is provided with small holes and the molding resin is molded so as to close the small holes from above and below, whereby the synthetic resin film is sandwiched by the molding resin.

(2) The surface of the synthetic resin film to which the molding resin is to be affixed is coated beforehand with a bonding agent and the molding resin is molded so as to contact the surface that has been coated with the bonding agent, whereby the molding resin is bonded to the synthetic resin film.

According to the method (1), the structure obtained is one in which the synthetic resin film is embraced by the molding resin, not one in which the two are bonded together. As a consequence, the adhesion between the film and the resin is poor and in some cases there is the danger that a gap will be formed between the two or that the two will become displaced relative to each other. Further, since the synthetic resin film is provided with holes, a completely sealed structure is not obtained since the holes are not perfectly filled with the molding resin. This means that the synthetic resin film cannot be endowed with a perfect waterproofing function.

According to method (2), excellent adhesion is obtained since the synthetic resin film and molding resin are bonded together. However, the synthetic resin film must be coated with the bonding agent before the molding resin is molded. This increases the number of process steps correspondingly.

Further, in a case where the synthetic resin film and molding resin consist of transparent materials and light is made to pass through them, problems such as heat discoloration and light discoloration arise depending upon the material used for the layer of bonding agent. Specifically, if the layer of bonding agent changes color, there is the danger that the transmittance of light will decline or that the color of the transmitted light will change.

In a situation where the molding resin has been attached by the layer of bonding agent during the forming of the synthetic resin film having this layer, heating of the molded product causes the layer of bonding agent to soften and to lose some of its adhesiveness. Thus there is the danger that the molding resin will peel off the synthetic resin film owing to residual stress possessed by the synthetic resin film after forming.

SUMMARY OF THE INVENTION

Accordingly, an object of the present invention is to provide a method of directly and strongly affixing a synthetic resin film and a molding resin easily and reliably.

In order to attain the foregoing object, the inventors have performed a variety of experiments and, as a result, have devised a method through which a synthetic resin film and a molding resin can be fused together strongly in a direct manner.

Specifically, according to the present invention, the foregoing object is attained by providing a method of affixing a molding resin to a synthetic resin film, comprising the steps of preparing a synthetic resin film consisting of a thermoplastic material and a molding resin consisting of thermoplastic material, stretching a prescribed surface of the synthetic resin film, simultaneously bringing the molding resin, which is molten and at a high temperature, into contact with the surface of the synthetic resin film, while stretching of the surface thereof is in progress, in such a manner that the molding resin presses directly against the surface in a state of high pressure, and subsequently cooling surfaces of contact between the synthetic resin film and molding resin to a temperature at which the molten molding resin solidifies, whereby the surfaces of contact between the synthetic resin film and molding resin are directly fused.

Other features and advantages of the present invention will be apparent from the following description taken in conjunction with the accompanying drawings, in which like reference characters designate the same or similar parts through the figures thereof.

DESCRIPTION OF THE PREFERRED EMBODIMENT

An overview of the method according to the present invention will be described first with reference to FIGS. 1(A) and 1(B), 2 and 8(A)–8(D).

Figure 1A:
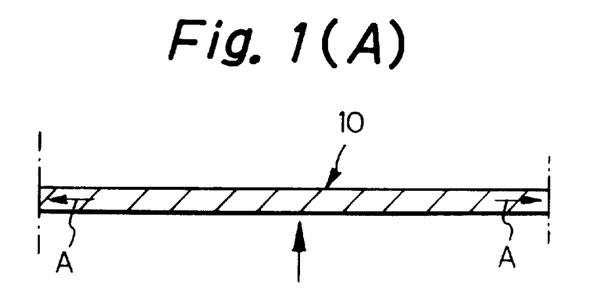
FIGS. 1(A) and 1(B) are diagrams illustrating the most basic arrangement of the method according to the present invention.
Figure 1B:
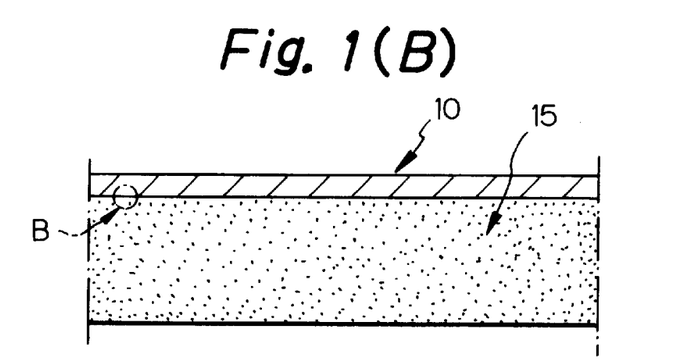

FIGS. 1(A) and 1(B) are diagrams illustrating the most basic arrangement of the method according to the present invention.

First, as shown in FIG. 1(A), a synthetic resin film 10 comprising a thermoplastic material is prepared. The film 10 is devoid of any bonding agent or the like.

Next, the synthetic resin film is stretched (in the directions indicated by the arrows A) so as to enlarge the area of a prescribed surface thereof. During the stretching operation, a molten high-temperature molding resin 15 is urged against the surface undergoing stretching so as to bring the molding resin into direct contact with the surface under a high pressure, whereby the molding resin 15 is directly molded on the surface of the synthetic resin film 10, as shown in FIG. 1(B).

At this time the molten molding resin 15 is fused strongly by heat and pressure to the synthetic resin film 10 at the interface between them.

It is required that the synthetic resin film 10 be a thermoplastic material. If the biaxial orientation of the synthetic resin film is good, it will not crack or suffer other damage when it is stretched. Such a film is appropriate. If overall consideration is given to such factors as price, printability, resistance to heat at molding, bending-fatigue durability and transparency, PETP (polyethylene terephthalate) film is ideal. An ideal film thickness is on the order to 38–150 μm. In order to improve resistance to heat, an excellent choice is PEN (polyethylene naphthalate) film. Synthetic resin films made of other materials also will enable the object of the invention to be attained so long as they are thermoplastic materials.

As for the molding resin 15, a crystalline or amorphous material is acceptable providing it is a thermoplastic material. However, in order to assure that the molded article will transmit light if this is a requirement, it will be necessary to use an amorphous material. If overall consideration is given to such factors as moldability under universal molding conditions, price, separability of the molds, degating, transparency, practical strength and resistance to the environment, resins such as PMMA resin (polymethyl methacrylate resin) and PC resin (polycarbonate resin) are suitable. If the molding resin need not transmit light, then crystalline PET or PBT (polybutylene terephthalate) may be used.

Figure 2:
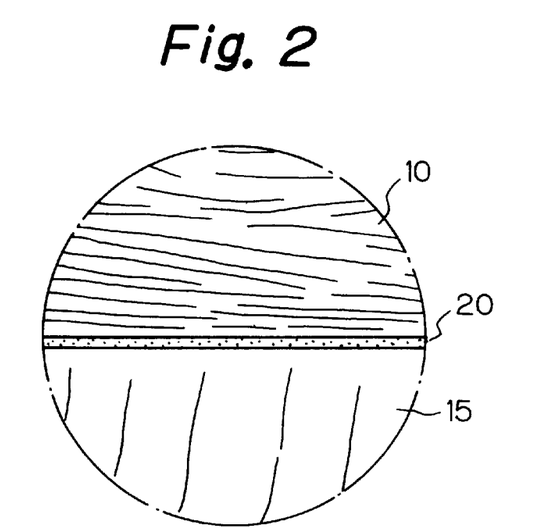
FIG. 2 is a diagram illustrating a photograph of a cross section in which the boundary between a molding resin and a synthetic resin film is shown in enlarged form (this is a photographic diagram of the cross section of a portion B in FIG. 1(B))

FIG. 2 is a diagram illustrating a photograph of a cross section, taken by a polarizing microscope, in which the boundary between the molding resin 15 and the synthetic resin film 10 is shown in enlarged form (this is a photographic diagram of the cross section of a portion B in FIG. 1(B)). FIG. 2 shows a case in which the method of the present invention is employed using PMMA resin as the molding resin 15 and a PETP film as the synthetic resin film 10.

In accordance with the present invention as illustrated in FIG. 2, it will be understood that the synthetic resin film 10 has a surface portion 20 which changes to an amorphous layer. This portion differs from the other portion, which is an oriented crystalline layer, of the synthetic resin film 10. This means that the surface of the synthetic resin film 10 has been melted by the heat from the molding resin 15.

It is believed that the synthetic resin film 10 and molding resin 15 become fused together strongly and directly for the following reasons:

Though the synthetic resin film 10 is an oriented crystalline layer, tensioning the oriented crystalline layer causes slipping between the polymer chains and brings about a disturbance which weakens the binding force between the polymer chains during tensioning. When the high-temperature, high-pressure molding resin contacts the synthetic resin film 10 at the same time that the binding force between the polymer chains is in the process of weakening, the polymer chains in the surface portion of the synthetic resin film 10 and the polymer chains of high-temperature, high-pressure molding resin 15 become mechanically and physically intertwined. As a result, the synthetic resin film and the molding resin become bound together strongly after cooling.

The inventors have conducted experiments in which a molten, high-temperature molding resin is directly molded, in a highly pressurized state, on the surface of a synthetic resin film in an unstretched or stretched state. As a result, it was determined that the molding resin and synthetic resin film could be fused together strongly.

More specifically, the inventors have found that in order to fuse a synthetic resin film and a molding resin together strongly in direct fashion, as is accomplished in the present invention, a molten, high-temperature molding resin is brought into direct contact with and is molded on the surface of a synthetic resin film in a highly pressurized state while stretching of the film is in progress. This is the only way in which the goal is attained.

Further, in accordance with the experiments conducted by the inventor, it has been determined that the more the synthetic resin film is stretched, the stronger the adhesion to the molding resin.

Figure 8A:
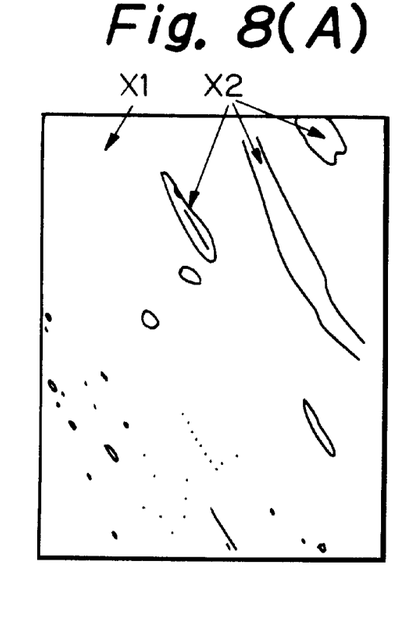
FIGS. 8(A)–8(D) are diagrams showing photographs, taken by an electron microscope (at a magnification of 1000×), illustrating the surfaces of a synthetic resin film and a molding resin when one is peeled off the other after they have been fused together using the method of the present invention.
Figure 8B:
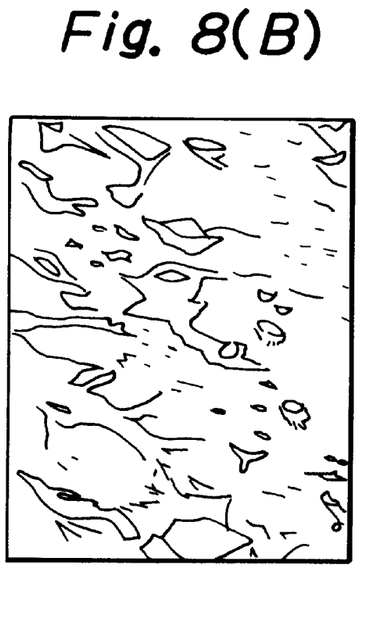
Figure 8C:
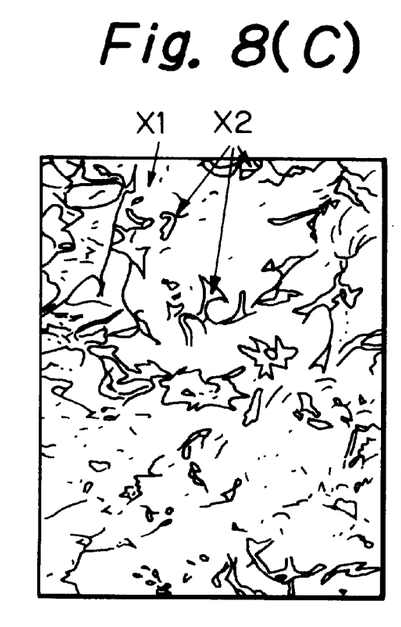
Figure 8D:
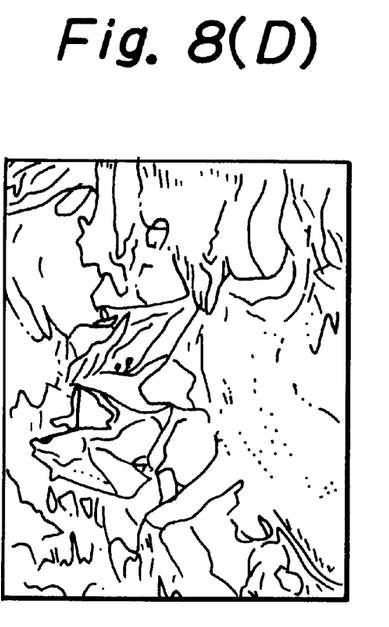

FIGS. 8(A)–8(D) are diagrams showing photographs taken by an electron microscope at a magnification of 1000×. These illustrate the surfaces of a synthetic resin film and a molding resin when one is peeled off the other after they have been fused together using the method of the present invention. FIGS. 8(A) and 8(B) are diagrams showing the surfaces of the molding resin and synthetic resin film, respectively, when the synthetic resin film has been peeled off a molded body composed of the affixed synthetic resin film and molding resin obtained by molding the molding resin on the synthetic resin film while the latter was being stretched by a small amount, and FIGS. 8(C), 8(D) are diagrams showing the surfaces of the molding resin and synthetic resin film, respectively, when the synthetic resin film has been peeled off a molded body composed of the affixed synthetic resin film and molding resin obtained by molding the molding resin on the synthetic resin film while the latter was being stretched by a large amount.

If the amount of stretching is small, as is the case in FIG. 8(A), the amount of synthetic resin film X2 remaining on the surface X1 of the molding resin when the synthetic resin film has been peeled off is small and scattered. Further, as shown in FIG. 8(B), not much of the surface of the synthetic resin film has been left roughened by peel-off. These diagrams signify that the polymer chains of the film and resin have undergone little mechanical and physical intertwining, as a result of which the film and resin do not adhere to each other very strongly.

Figure 3A:
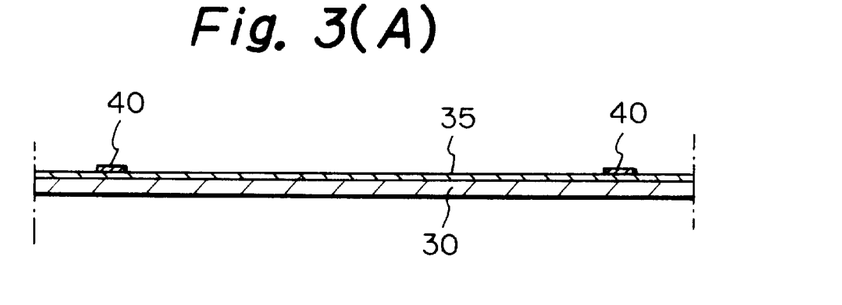
FIGS. 3(A)–3(C) are schematic side sections illustrating a method of forming a keytop by molding a molding resin to synthetic resin film according to the present invention.
Figure 3B:
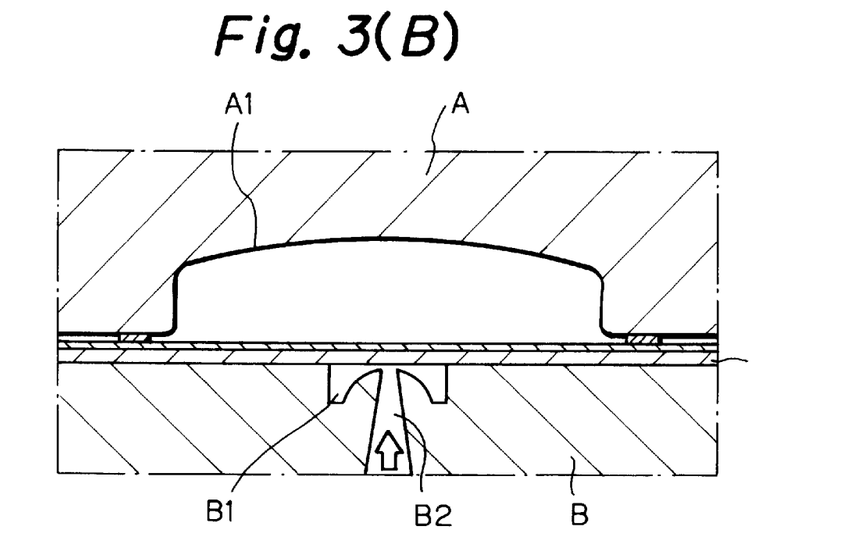
Figure 3C:
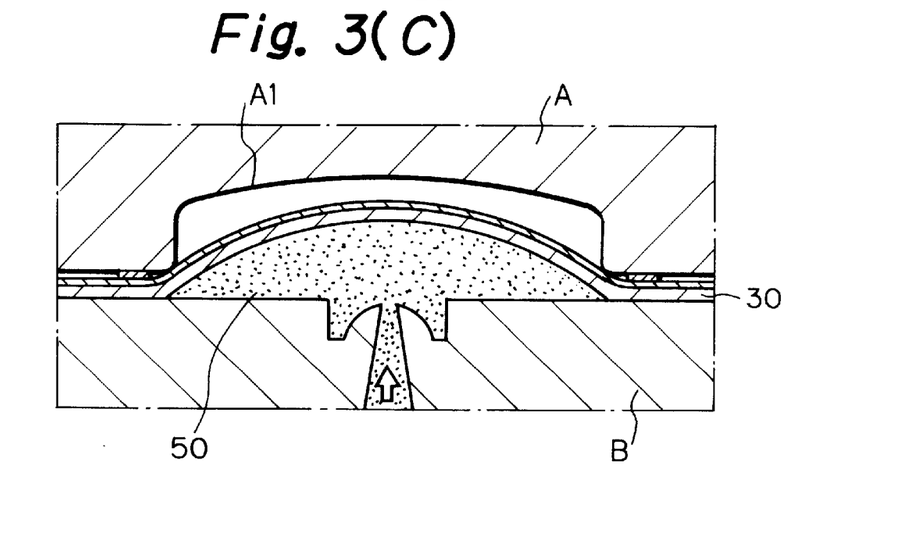

By contrast, when the amount of stretching is large, as is the case in FIG. 3(C), the amount of synthetic resin film X2 remaining on the surface X1 of the molding resin when the synthetic resin film has been peeled off is large. Further, as shown in FIG. 8(D), much of the surface of the synthetic resin film has been left roughened by peeling off the film. These diagrams signify that the polymer chains of the film and resin have undergone extreme mechanical and physical intertwining, as a result of which the film and resin adhere to each other fairly strongly.

A preferred embodiment of the present invention will now be described in detail with reference to the remaining drawings.

FIGS. 3(A)–3(C) and FIGS. 4(A)–4(C) are schematic side sections illustrating a method of forming a keytop by molding a molding resin to synthetic resin film according to the present invention.

In order to form a keytop, a synthetic resin film 30 made of PETP is prepared, as shown in FIG. 3(A), and a desired print layer 35 of modified urethane resin is printed on the entire surface of the synthetic resin film 30. Next, a ring-shaped print layer 40 of modified urethane resin for being clamped by molds is printed on the print layer 35 so as to surround the periphery of the portion to be formed into a keytop. In the illustrated embodiment, the synthetic resin film 30 has a thickness of 75 μm. Further, for descriptive purposes, the synthetic resin film 30 and print layer 35 are shown to be much thicker than they are in actuality.

Next, as illustrated in FIG. 3(B), the synthetic resin film 30 is clamped strongly by upper and lower molds A, B, respectively. The upper mold A is provided with a cavity A1 (having a diameter of approximately 6 mm) the shape of which is identical with that of the upper portion of the keytop, and the lower mold B is provided with a cavity B1 the shape of which is identical with that of the lower portion of the keytop (essentially the push-rod portion of key). A pin gate B2 is connected to the cavity B1 of the lower mold B. The upper and lower molds A, B are heated beforehand to a temperature of 80±10° C.

A molten high-temperature, high-pressure molding resin 50 (PMMA resin in this embodiment) is forcibly charged into the cavity B1 from the pin gate B2. The melting point of the molding resin 50 is about 260° C. and the pressure is about 600 kgf/cm².

Figure 4A:
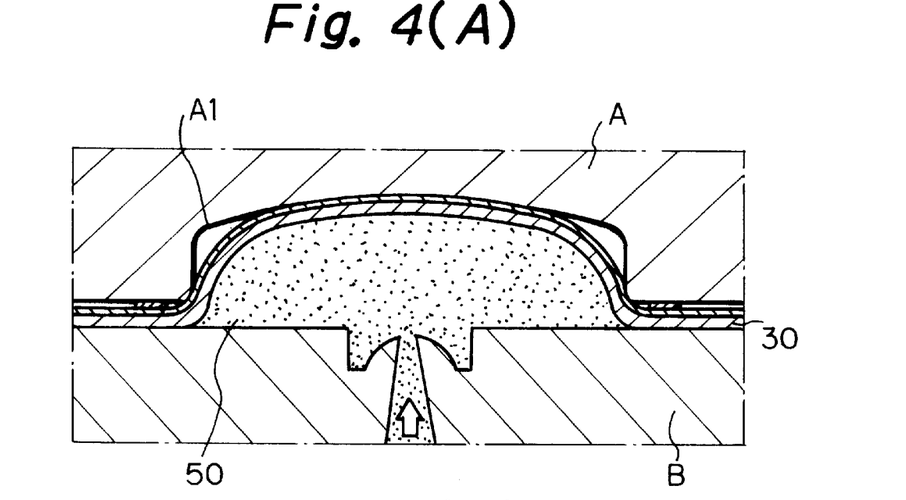
FIGS. 4(A)–4(C) are schematic side sections illustrating a method of forming a keytop by molding a molding resin to synthetic resin film according to the resent invention.
Figure 4B:
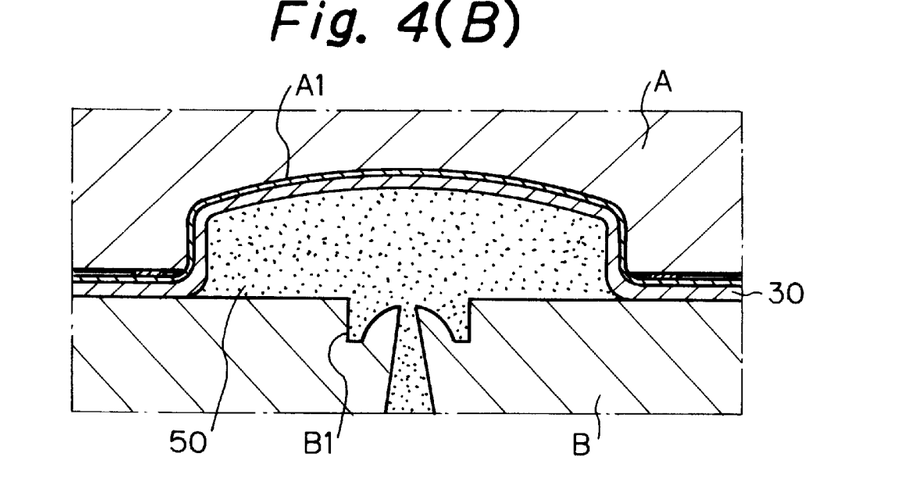
Figure 4C:
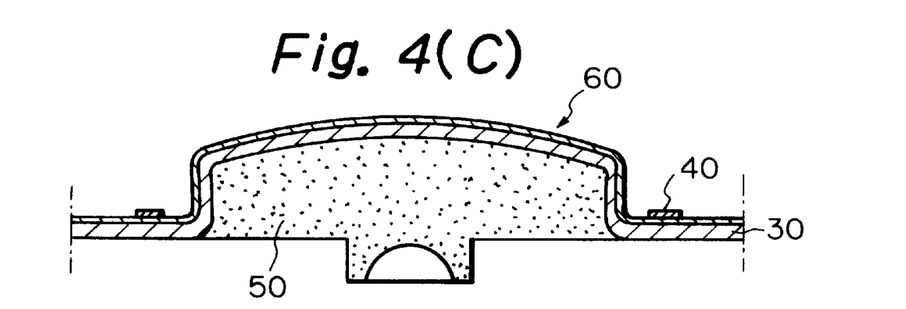

Owing to the heat and pressure of the molten molding resin 50, the portion of the synthetic resin film 30 facing cavity A1 is progressively deformed, as shown in FIGS. 3(C) and 4(A), until the film eventually comes into intimate adhering contact with the inner surface of the cavity A1, as illustrated in FIG. 4(B). At the same time, the molten molding resin 50 fills the interior of the cavities A1, B1.

Figure 5:
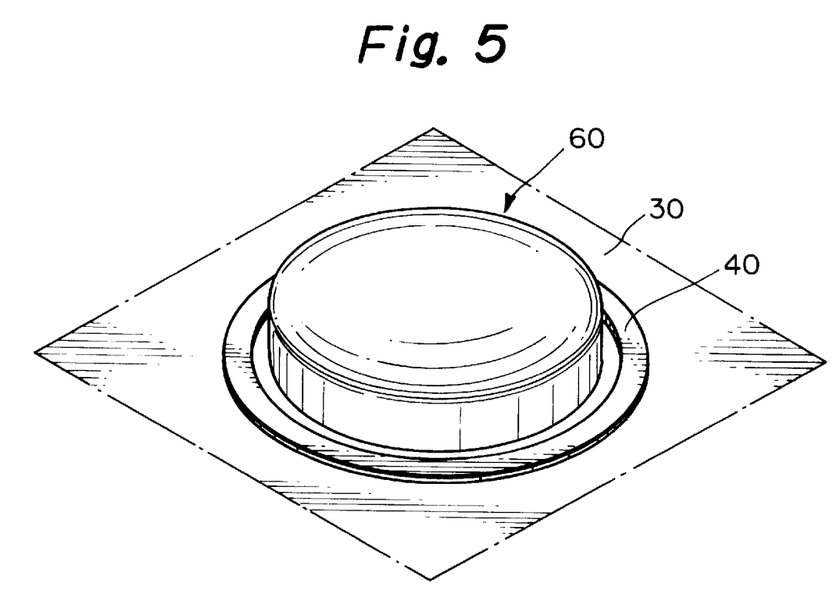
FIG. 5 is a perspective view showing a completed keytop.

At the end of injection molding, the apparatus is left standing for several dozen seconds to await hardening of the molding resin 50. Once the resin has hardened, the upper and lower molds A, B are separated so that a keytop 60 shown in FIG. 4(C) can be extracted. FIG. 5 is a perspective view showing the completed keytop 60.

It will be understood from the foregoing steps that the synthetic resin film 30 is stretched when it is deformed. In other words, while the synthetic resin film 30 is being stretched, the molten high-temperature molding resin 50 is made to simultaneously contact the surface of the film in the course of the stretching thereof in such a manner that the resin 50 presses against the film directly in a state of high pressure. Accordingly, as set forth above, the surface of the synthetic resin film 30 which contacts the molding resin 50 is fused while being stretched, whereby the respective polymer chains become mechanically and physically intertwined. The synthetic resin film 30 and molding resin 30 become strongly affixed to each other after cooling and hardening.

In the foregoing embodiment, the print layer 40 for being clamped by the molds is printed about the periphery of the keytop 60. The reason for this that when the synthetic resin film 30 is clamped by the upper and lower molds A, B and then caused to deform, each portion of the synthetic resin film 30 at the periphery of the cavity A1 will be pulled into the cavity A1 by a fixed and uniform amount. In a case where a desired design or the like has been printed beforehand on the surface of the synthetic resin film to be deformed, the print layer 40 is particularly useful for the purpose of deforming the design accurately. Further, in a case where the upper and lower molds are provided with a number of cavities and a number of keytops are molded simultaneously, the synthetic resin film clamped by the upper and lower molds A, B may not be pressed uniformly over the entirety thereof owing to non-uniformity in the thickness of the synthetic resin film or the degree of smoothness and degree of flatness of the surfaces of the upper and lower molds A, B. If the print layer 40 for being clamped by the molds is provided, however, the amount of synthetic resin film pulled into each of the cavities is made uniform even in this case by virtue of the cushioning property and viscosity of the print layer 40. Accordingly, in a case where designs have been printed on the portions of the synthetic resin film that will form the keytops, the rate at which the design of each keytop is stretched and enlarged can be rendered uniform.

In a case where other means for limiting the amount by which the synthetic resin film 30 is pulled in is provided or in a case where some amount of pull-in of the synthetic resin film 30 is allowable, the print layer 40 for being clamped by the molds is unnecessary.

Figure 6:
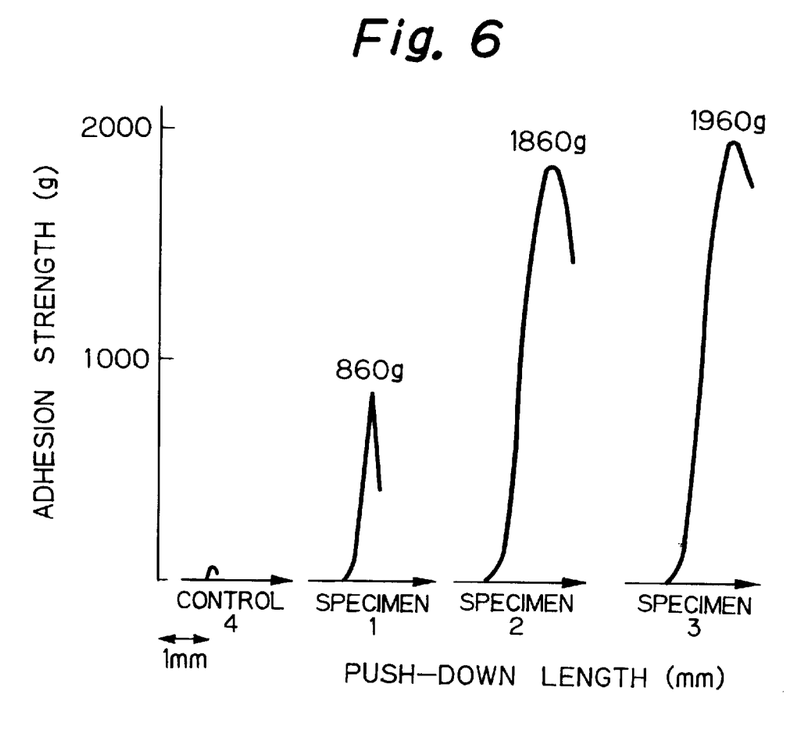
FIG. 6 is a diagram showing the results of testing adhesion strength between a synthetic resin film and molding resin in the keytop of FIG. 5.
Figure 7:
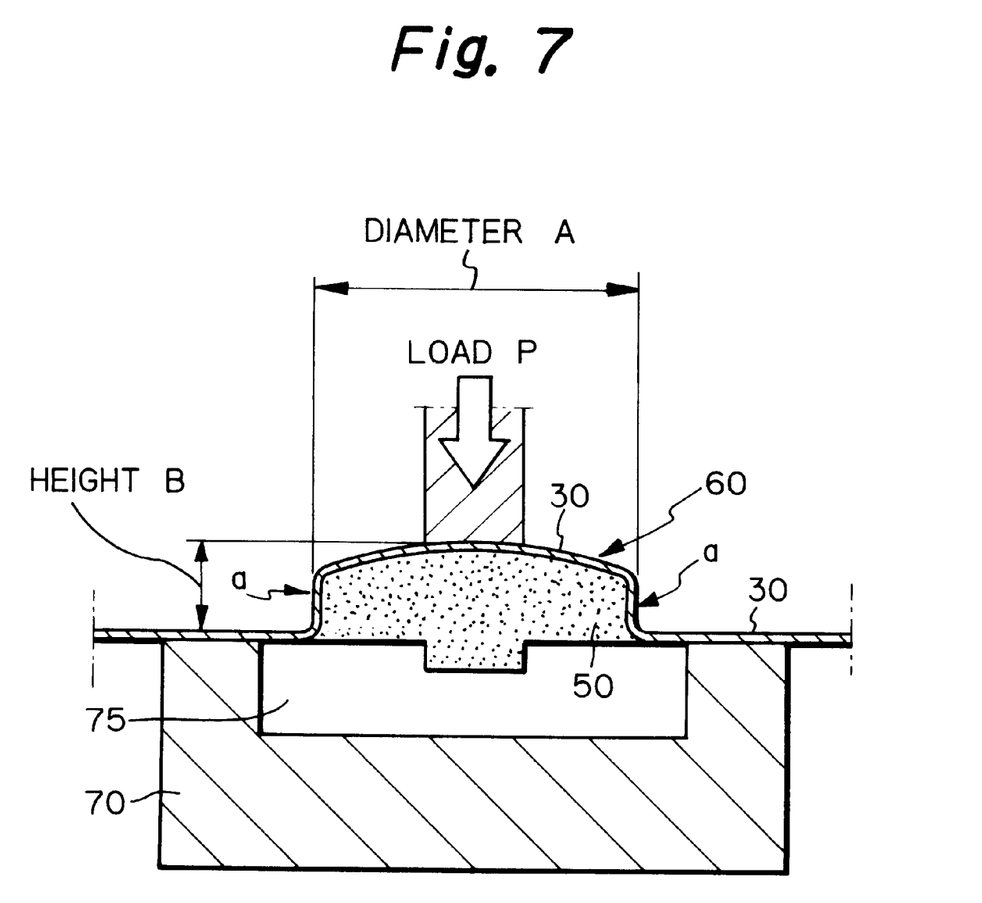
FIG. 7 is a diagram showing a method of testing adhesion strength between a synthetic resin film and molding re sin in the keytop of FIG. 5.

FIG. 6 is a diagram showing the results of testing adhesion strength between the synthetic resin film 30 and the molding resin 50 of the keytop 60 manufactured as set forth above, and FIG. 7 is a diagram showing the method of testing the adhesion strength.

As shown in FIG. 7, the testing method included preparing a base 70 having a circular recess at the center thereof, placing the keytop 60 on the base 70, applying a load P from above the keytop 60 and measuring the value of the load at an outer circumferential side portion a of the keytop 60 when the molding resin 50 is peeled off the synthetic resin film 30.

The keytops 60 used in the test were of three types or specimens 1, 2 and 3.

Specimen 1: diameter A=6.2 mm, height B=0.89 mm
Specimen 2: diameter A=6.2 mm, height B=1.19 mm
Specimen 3: diameter A=6.2 mm, height B=1.535 mm As shown in FIG. 6, it will be understood that the molding resin 50 and synthetic resin film 30 are bonded together strongly in all of the keytops. However, it will also be appreciated that the greater the height B, i.e., the higher the stretching enlargement rate of the synthetic resin film 30, the higher the strength of adhesion.

A specimen 4 in FIG. 6 serving as a control was obtained by directly molding the molding resin on the circular surface (having a diameter of 6.2 mm) of an unstretched synthetic resin film. Peeling strength prevailing when the molding resin was tensioned was measured. It will be understood that the molding resin failed to adhere to the synthetic resin film almost completely.

Though the foregoing embodiment has been illustrated with regard to an example in which a keytop is formed using the method of the present invention, it goes without saying that the invention can be utilized in any application in which a molding resin is molded directly on a synthetic resin film.

Thus, in accordance with the inventive method of affixing a synthetic resin film and a molding resin, the molding resin can be affixed to the synthetic resin film strongly and easily. When the molding resin is affixed to the synthetic resin film, the latter need not be provided with any holes. This provides the synthetic resin film with a waterproofing function. Further, the adhesive strength between the synthetic resin film and the molding resin is excellent and there is no danger that the two will become displaced or that a gap will develop between them. In addition, the manufacturing process is simplified because a bonding agent is unnecessary.

As many apparently widely different embodiments of the present invention can be made without departing from the spirit and scope thereof, it is to be understood that the invention is not limited to the specific embodiments thereof except as defined in the appended claims.

What is claimed is:

1. A method for fixing together a synthetic resin film and a molding resin comprising the steps of:

providing an upper die including a cavity having at least an inner surface of a predetermined configuration, a lower die having at least a pin gate, a synthetic resin film including a biaxially stretched polyethylene terephthalate film or a biaxially stretched polyethylene naphthalate film, and a molding resin including a thermoplastic resin material other than the synthetic resin constituting the synthetic resin film;

clamping the synthetic resin film between a portion of the upper die at a periphery of the cavity and the lower die;

injecting, under pressure, the molding resin in a molten state from the pin gate in the lower die to urge the molten molding resin against a portion of the synthetic resin film which is positioned in the cavity of the upper die and is not clamped between the portion of the upper die at the periphery of the cavity and the lower die, to thereby stretch the portion of the synthetic resin film until it comes into intimate contact with the inner surface of the cavity, while, at the same time, filling the cavity with the molten molding resin; and subsequently cooling the molten molding resin until it is solidified, whereby the stretched portion of the synthetic resin film and the molding resin are directly fused together.

2. A method for fixing together a synthetic resin film and a molding resin according to claim 1, wherein the molding resin comprises a polymethyl methacrylate resin or a polycarbonate resin.

3. A method for fixing together a synthetic resin film and a molding resin according to claim 1, wherein the synthetic resin film has a thickness of 38 to 150 micrometers.

* * * * *